United States Patent

Canu, Jr. et al.

[11] Patent Number: 4,599,784
[45] Date of Patent: Jul. 15, 1986

[54] METHOD OF ASSEMBLING FLEXIBLE CONDUIT AND FITTING

[75] Inventors: Anthony Canu, Jr., Waterbury; Allen G. Hoube; Kenneth F. Knight, both of Watertown; Albert L. Tufano, Stratford; Anthony J. Porzio, Waterbury, all of Conn.

[73] Assignee: Anamet, Inc., Waterbury, Conn.

[21] Appl. No.: 584,208

[22] Filed: Feb. 27, 1984

[51] Int. Cl.$^4$ ............................................. B23P 11/02
[52] U.S. Cl. ........................................ 29/450; 29/452; 138/122; 138/132; 285/251
[58] Field of Search .................... 29/157 R, 450, 240, 29/446, 452; 138/132, 109, 122, 133; 285/251, 331

[56] References Cited

U.S. PATENT DOCUMENTS

| | | |
|---|---|---|
| 2,901,024 | 8/1959 | Marsden, Jr. |
| 2,918,314 | 12/1959 | Kemnitz ........................... 285/251 X |
| 2,936,812 | 5/1960 | Roberts . |
| 3,002,534 | 10/1961 | Noland ................................ 138/141 |
| 3,047,026 | 7/1962 | Kahn .................................. 138/122 |
| 3,058,493 | 10/1962 | Muller ................................ 138/133 |
| 3,063,303 | 11/1962 | Cadwallader ......................... 74/501 |
| 3,138,511 | 6/1964 | Cadwallader ....................... 156/431 |
| 3,381,716 | 5/1968 | Michael ............................... 138/109 |
| 3,528,457 | 9/1970 | Martin et al. ....................... 138/132 |
| 3,559,693 | 2/1971 | Reynard .............................. 138/133 |
| 3,565,119 | 2/1971 | Pierpoint, Jr. ...................... 138/132 |
| 3,568,722 | 3/1971 | Runshe ........................... 138/109 X |
| 3,988,188 | 10/1976 | Johansen et al. .................... 156/143 |
| 4,098,298 | 7/1978 | Vohrer ................................ 138/122 |
| 4,140,154 | 2/1979 | Kanao ................................. 138/132 |
| 4,238,260 | 12/1980 | Washkewicz ....................... 156/149 |

FOREIGN PATENT DOCUMENTS

| | | | |
|---|---|---|---|
| 2317585 | 2/1977 | Fed. Rep. of Germany | 285/251 |
| 2332846 | 1/1975 | France | 285/251 |
| 861770 | 2/1961 | United Kingdom | 285/251 |

*Primary Examiner*—Charlie T. Moon
*Attorney, Agent, or Firm*—Prutzman, Kalb, Chilton & Alix

[57] ABSTRACT

A flexible plastic conduit having a pair of longitudinally extending reinforcement tapes to improve the resistance to elongation of the flexible plastic conduit is provided. A fitting is also provided to cooperate with the flexible tubing to provide the proper resistance to forces trying to separate the flexible conduit and the fitting when in assembled relationship. A method for assembling the flexible conduit and the fitting is also provided.

6 Claims, 5 Drawing Figures

U.S. Patent  Jul. 15, 1986  4,599,784
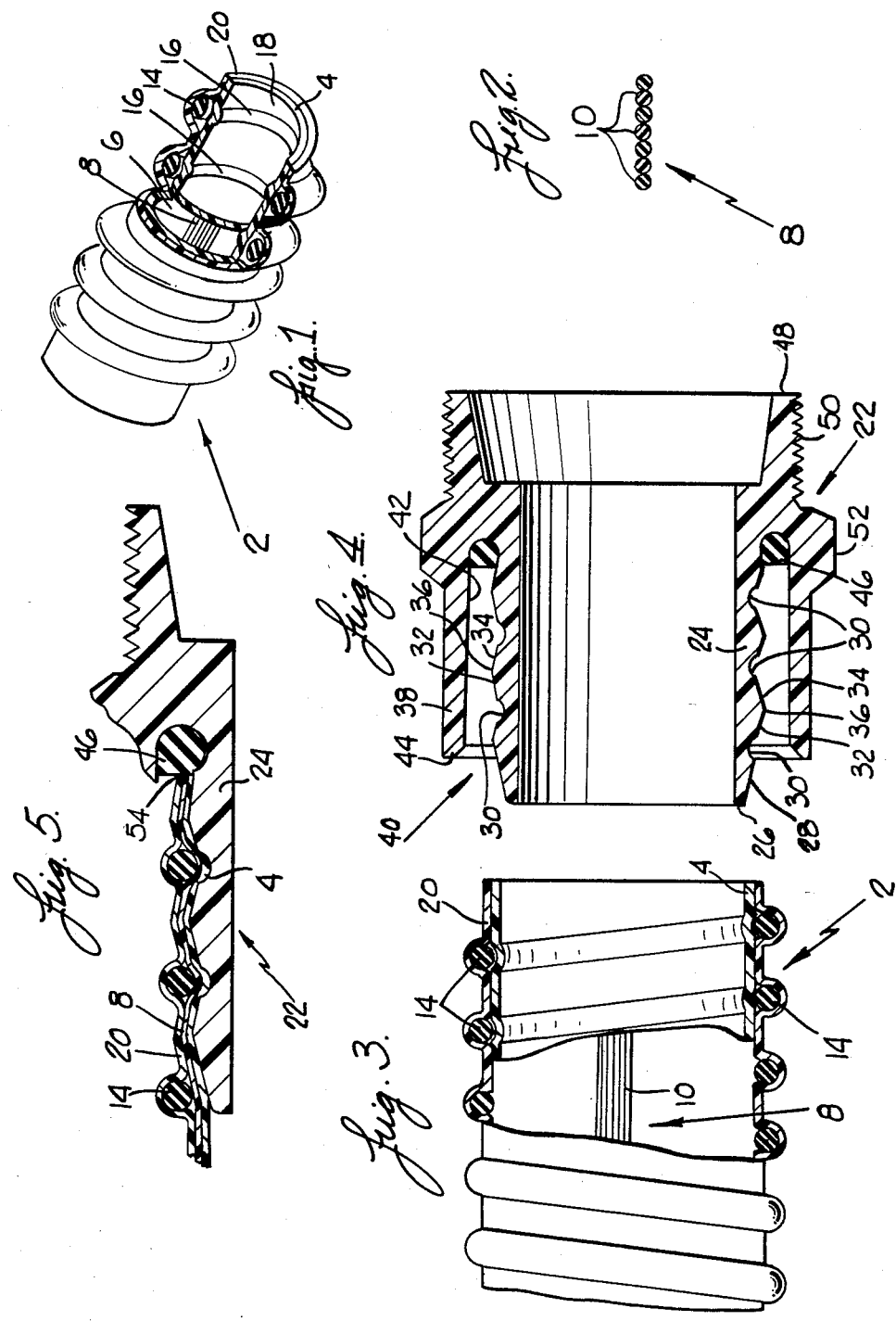

ND OF ASSEMBLING FLEXIBLE CONDUIT
METHOD OF ASSEMBLING FLEXIBLE CONDUIT AND FITTING

FIELD OF THE INVENTION

This invention relates generally to the field of flexible conduits and more particularly to the field of flexible conduits formed primarily from plastic materials and a fitting for cooperation therewith.

BACKGROUND OF THE INVENTION

For many years, manufacturers have been making flexible conduits from various types of materials. There are several reasons, such as costs, fatigue/flexure life and weight, why it is desirable to make such flexible conduits from plastic materials, such as PVC, nylon or any extrudable material capable of being readily flexed when in a generally tubular shape. One disadvantage associated with the use of flexible plastic materials to make such flexible conduits is the tendency of these materials to elongate even when subjected to relatively low tensile forces. These elongation characteristics are even greater approaching 100% when such flexible conduits are subjected to tensile forces exceeding 75 pounds. As with all types of conduits, a flexible conduit must be provided with a fitting capable of cooperating with the conduit to provide a suitable connection under the desired operating conditions. Thus, if the flexible conduit is desired to be used in operating conditions wherein elongation of the flexible conduit is required to be limited to less than 10% when subjected to tensile forces exceeding 75 pounds, it is necessary that the flexible conduit and the fitting must be able to resist the tendency to separate or leak when subjected to the same forces.

BRIEF SUMMARY OF THE INVENTION

This invention provides a flexible conduit formed primarily from plastic materials but provided with means to insure a low elongation factor even when subjected to tensile forces exceeding 75 pounds. In the preferred embodiment, this low elongation factor is obtained by securing at least one longitudinally extending reinforcement tape to the outer surface of an inner continuous layer of a flexible material. A fitting is provided for use with the flexible conduit wherein the fitting is provided with a male member having a threaded outer surface in engagement with a portion of the inner surface of the inner layer. The outer diameters of portions of the threaded outer surface are greater than the inner diameter of the inner layer so that when the flexible conduit is positioned over the male member, portions of the flexible conduit over the male member have been stretched or enlarged. Since the flexible conduit is formed from materials having a tendency to return to their original configuration, the stretched portions will exert compressive forces on the associated outer surfaces of the male member to resist separation between the flexible conduit and the fitting. Also, since the reinforcement tape follows the profile of the threaded outer surface, the reinforcement tape is formed into a corrugated configuration. As tensile forces are increased, the reinforcement tapes begin to return to a straight configuration which increases the contact pressure of the reinforcement tape and the inner layer against the male member of the fitting. This contact pressure increases as the tensile forces increase to provide additional resistance against the separation of the flexible conduit and the fitting.

In the preferred embodiment, the flexible conduit comprises an inner layer comprising a flexible tube of PVC material with two longitudinally extending reinforcement tapes secured to the outer surface of the flexible tube. The tapes are spaced evenly from each other, so that they are substantially 180° apart. A spiral coil of a rigid plastic material is secured to the outer surface of the flexible tube and the reinforcing tapes and exerts sufficient force on the flexible tube so that a spirally extending protuberance extends inwardly from the inner surface of the flexible tube. The flexible tube, the reinforcement tapes and the spiral coil are encapsulated by a covering material that is in contact with the outer exposed surfaces of the flexible tube, the reinforcement tapes and the spiral coil. As described above, a fitting is provided for cooperation with an associated portion of the flexible conduit to resist any forces trying to separate the flexible conduit and the fitting when in assembled relationship. The flexible conduit and the fitting are assembled and cooperate in the manner described above.

It is an object of this invention to provide a flexible conduit having low elongation characteristics.

It is another object of this invention to provide a flexible conduit having low elongation characteristics made from plastic materials.

It is a further object of this invention to provide a fitting for use with such flexible conduit and cooperating therewith to provide the necessary resistance to separation between the flexible conduit and the fitting.

It is another object of this invention to provide a method for assembling a flexible conduit and a fitting to provide a sealed, liquid tight joint with high resistance to separation between the flexible conduit and the fitting.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWING

FIG. 1 is a pictorial view with parts in section of a flexible conduit of this invention;

FIG. 2 is a cross-sectional view of a reinforcement tape used in this invention;

FIG. 3 is a side elevation of the flexible conduit of FIG. 1 with parts in section;

FIG. 4 is a cross-sectional view of a fitting of this invention; and

FIG. 5 is a cross-sectional view illustrating a portion of the flexible conduit and fitting in the assembled relationship.

DETAILED DESCRIPTION OF THE INVENTION

The preferred embodiment of the invention illustrated in the drawing comprises a flexible conduit 2 having an inner layer 4 which comprises an extruded continuous conduit formed from a flexible PVC material. The inner layer 4 is provided with low elongation characteristics by securing to the outer surface 6 thereof a reinforcement tape 8 which extends longitudinally of the inner layer. The tape 8 comprises a plurality of continuous strands 10 of a material having low elongation characteristics which in the preferred embodiment is rayon. Other materials such as synthetic or natural fibers and metals may be used as long as they have low elongation characteristics and are compatible with the other materials in the flexible conduit. The continuous strands 8 are secured to the outer surface of the inner layer 4 by any suitable means, such as by bonding. In the preferred embodiment, two reinforcement tapes are secured on opposite sides, spaced 180° apart, of the outer surface 6 of the inner layer 4. More than two reinforcement tapes 8 may be secured to the outer surface 6 but while additional tapes provide greater resistance to elongation, they also reduce the flexibility of the conduit. Sufficient elongation characteristics may be obtained from only one tape but this is less preferred.

A spiral coil 14 is secured to the outer surface 6 of the inner layer 4 by any suitable means such as by bonding. The spiral coil 14 is formed as a rigid member to provide crush resistance for the inner layer 4 and the reinforcement tapes 8. The inner diameter of the spiral coil 14 is slightly smaller than the outer diameter of inner layer 4 so that when the spiral coil 14 is placed over the inner layer 4 it displaces the adjacent portion of the inner layer 4. As illustrated in FIGS. 1 and 3, this displacement forms a spirally extending protuberance 16 extending inwardly from the inner surface 18 of the inner layer 4 for a purpose to be described. Also, the protuberance 16 is small enough so that wires may be readily pulled through the flexible conduit but minimizes the contact between the inner surface of the inner layer 4 and the wires during such operation. After the inner layer 4, the reinforcement tapes 8 and the spiral coil 14 have been assembled into a unit, the outer surface of the unit is encapsulated within a cover 20 which is preferably made from the same material as the inner layer 4 so as to be compatible therewith.

In FIGS. 4 and 5, there is illustrated a fitting 22 to be used with the flexible conduit 2. The fitting 22 is an integral unit having an inner male member 24. Adjacent to the end 26, the male member 24 is provided with a tapered outer surface 28 having its smallest diameter adjacent to the end 26. A spiral groove 30 is formed in the outer surface of the male member 24. The portion of the outer surface of the male member 24 between adjacent portions of the spiral groove 30 is formed by two slanted walls 32 and 34 which meet to form a spirally extending continuous apex 36. As illustrated in FIGS. 4 and 5, the largest outer diameter of the male member 24 is at the apex 36. The fitting 22 has an outer wall 38 surrounding the male member 24 and spaced therefrom to form an annular space 40 therebetween. The outer wall 38 is provided with a tapered inner surface 42 with the largest inner diameter of the inner surface 42 being adjacent to the end 44 of the outer wall 38. A resilient material 46 is located in the innermost portion of the annular space 40 and is in contact with the outer surface of the male member 24 and the inner surface 42 of the outer wall 38. The distance between the apex 36 and the inner surface 42 is smaller than the combined thickness of the inner layer 4, the reinforcement tape 8, the spiral coil 14 and the cover 20 for a purpose described below. The outer surface of the fitting 22 adjacent to the end 48 is provided with threads 50 which are designed for the type of service in which the flexible conduit 2 is to be used. Also, the surface 52 is shaped conventionally (not shown) to accommodate a proper tool when the flexible conduit 2 is being assembled into its working environment. A fitting 22 is provided on each end of the flexible conduit.

The assembled relationship between the flexible conduit 2 and the fitting 22 is illustrated in FIG. 5. The inner diameter of the inner layer 4 is designed to be only slightly larger than the smallest diameter of the tapered surface 28 so that the inner surface 18 of the inner layer 4 contacts the tapered surface 28 adjacent to the end 26 of the fitting 22. Sufficient force is applied in a longitudinal direction to start the flexible conduit 2 moving over the tapered surface 28. As the flexible conduit 2 moves over the tapered surface 28, the inner diameter of the portions of the flexible conduit 2 between the spiral coil 14 is gradually increased and the material in those portions is stretched. The inner diameter of the protuberance 16 is slightly smaller than the smallest outer diameter of the groove 30 to insure contact between the protuberance 16 and the surface of the groove 30. Since the spiral coil 14 will not expand, the difference in diameters between the protuberance 16 and the groove 30 is designed to be minimum, only enough to insure contact, in order to avoid excessive assembly forces. Therefore, in addition to the longitudinal force, described above, a rotational force is also applied to the flexible conduit 2 so that the protuberance 16 follows the contour of the groove 30. As illustrated in FIG. 5, the portions of the inner layer 4, the reinforcement tape 8 and the cover 20 between adjacent coils of the spiral coil 14 follow the contour of the slanted surfaces 32 and 34 and the apex 36. Since the material in the inner layer 4 and the cover 20 has a natural tendency to resile, that is, to return to its original dimensions, the inner surface of the inner layer 4 is in firm engagement with the associated surfaces of the male member 24 including the surfaces 32 and 34 and the spiral apex 36. Because of this tendency, compressive forces are generated by the inner layer 4 and the cover 20 against the male member 24 to hold the flexible conduit 2 and the fitting 22 in the assembled relationship against forces trying to separate them. The application of the longitudinal and rotational forces is continued until the leading edge 54 of the flexible tube is embedded in the resilient material 46 to insure a seal.

As described above, the inner surface 42 is tapered. However, the fitting is designed so that in most sizes, the greatest distance between the apex 36 and the inner surface 42 is less than the combined thickness of the inner layer 4, the spiral coil 14 and the cover 20. This design adds additional resistance to any forces trying to separate the flexible conduit 2 from its assembled relationship in the fitting 22. Satisfactory results will be obtained if only the average distance between the apex 36 and the inner surface 42 is less than the combined thickness of the inner layer 4, the spiral coil 14 and the cover 20. In those designs wherein the foregoing relationship does not exist, the greatest distance between the apex 36 and the inner surface 42 is less than the combined thickness of the inner layer 4, the reinforcement tape 8, the spiral coil 14 and the cover 20. In addition to the frictional forces generated by the compressive forces generated by the inner layer 4 and the cover 20, the reinforcement tapes 8 follow the profile of the outer surface of the male member 24 so that the reinforcement tape is formed into a corrugated configuration. As tensile forces are increased, the reinforcement tapes begin to return to a straight configuration which increases the contact pressure of the reinforcement tape and the inner layer against the male member of the fitting. This contact pressure increases as the tensile forces increase to provide additional resistance against the separation of the flexible conduit and the fitting.

In a preferred embodiment of the invention, the inner layer 4 comprises an extruded flexible PVC material in sizes having diameters of about ⅜ inch to 2.0 inch and a wall thickness of about 0.020 to 0.030 inch. The reinforcement tape 8 comprises a plurality of strands of continuous rayon filaments bonded together to form a flat tape having a width of about 0.100 to 0.250 inch and a thickness less than about 0.014 inch. It is understood that the use of a reinforcement tape formed from continuous strands in the preferred embodiment is for illustration purposes only and the tape can be formed in any manner, such as by weaving, so long as it posesses the desired elongation characteristics. Also, the reinforcement tape can be made from materials other than rayon, such as any synthetic or natural fibers and metals, as long as the desired elongation characteristics are obtained. Two tapes spaced 180° apart are secured to the outer surface of the inner layer 4 using an adhesive. The reinforcement tapes 8 extend in a longitudinal direction. The spiral coil 14 is a rigid PVC coil bonded to the outer surfaces of the inner layer 4 and the reinforcement tapes 8 with an adhesive. The encapsulating cover 20 comprises a flexible PVC material, similar to that in the inner layer 4, and is applied while hot so as to bond to the outer exposed surfaces of the inner layer 4, the reinforcement tapes 8 and the spiral coil 14. It is understood that use of PVC for the flexible conduit 2, spiral coil 14 and cover 20 is for illustration purposes only and they can be formed from any other materials having similar characteristics such as nylon, polyester and aramid. The fitting 22 is integrally molded from nylon or other suitable material. An elastomer 46, comprising silicone or other suitable material, is inserted into the annular space 40 while still in the uncured state so that it will bond to and conform to the shape of the surfaces it contacts and will cure to provide a resilient member.

A flexible conduit with two reinforcement tapes and fitting formed in accordance with the foregoing description has a tensile strength of at least 125 pounds, i.e., fitting pull off or conduit failure not less than 125 pounds with a maximum of 10% elongation.

While the preferred embodiments of the invention have been illustrated and described herein, it may be otherwise embodied and practiced within the scope of the following claims.

What is claimed is:
1. A method for assembling a flexible conduit and a single piece fitting to provide an interlocked assembly of improved elongation resistance comprising:
providing an inner layer for the conduit having substantially smooth cylindrical inner and outer surfaces of predetermined diameters,
securing at least one reinforcement tape to the outer surface of said inner layer and positioning said reinforcement tape so that it extends in a longitudinal direction,
applying to said outer surface a spiral coil having an inner diameter less than the diameter of said outer surface to displace portions of said layer and said tape under said spiral coil and form a spiral protuberance extending inwardly of said predetermined inner surface diameter, said tape conforming to the displaced portions of said layer and having a resistance to elongation greater than the resistance to elongation of said inner layer,
applying a conforming cover over said spiral coil to encapsulate said coil between said inner layer and said cover;
providing a single piece fitting having a male element and an integral confining wall spaced therefrom, said male element being provided with an outer surface of varying diameters and a plurality of said varying diameters being greater than the predetermined inner surface diameter of said inner layer;
applying longitudinal and rotational forces to said flexible conduit and said fitting to cause relative movement to position said flexible conduit over said male element; and
expandably displacing a portion of said inner layer and said cover located between adjacent coils of said spiral protuberance by said plurality of greater diameters on said male element so as to produce compressive forces exerted on said male element by said inner layer, said spiral coil and said cover so as to resist forces trying to separate said flexible conduit from said fitting while limiting the elongation of the conduit to less than 10 percent when subject to a tensile force of at least 75 pounds.

2. A method as in claim 1 and further comprising:
securing at least two reinforcement tapes to the outer surface of said inner layer and positioning said reinforcement tapes so that they extend in a longitudinal direction and are spaced equidistantly apart.

3. A method as in claim 2 and further comprising;
securing said rigid spiral coil to said inner layer;
forming a spirally extending groove in said outer surface of said male element;
seating said protuberance in said groove so that said protuberance moves in said groove during said relative movement of said flexible conduit and said fitting; and
forming said protuberance to have an inner diameter slightly less than the smallest outer diameter of said groove to insure contact between the surfaces of said protuberance and said groove.

4. A method as in claim 3 and further comprising:
forming a confined annular space around said male member with said annular space having an opening;
depositing a resilient material in said annular space; and
embedding one end of said flexible conduit in said resilient material.

5. A method as in claim 1 and further comprising;
securing said spiral coil to said inner layer; said integral confining wall and the outer surface of said male element forming an annular space therebetween, said space at said plurality of greater diameters having a radial dimension less than the thickness of said flexible conduit, and
seating said spiral coil in said annular space so that said wall cooperates with said male element to resist forces trying to separate said conduit from said fitting.

6. a method as in claim 5 and further comprising:
depositing a resilient material at the innermost portion of said annular space and in contact with said male element and said confining wall.

* * * * *